US011189110B2

(12) United States Patent
Salter et al.

(10) Patent No.: US 11,189,110 B2
(45) Date of Patent: Nov. 30, 2021

(54) EXTERIOR APPLIQUE CHANGEABLE STEALTH BADGING (71) Applicant: Ford Global Technologies, LLC, Dearborn, MI (US)

(72) Inventors: Stuart C. Salter, White Lake, MI (US); Annette Lynn Huebner, White Lake, MI (US); Paul Kenneth Dellock, Northville, MI (US); Pietro Buttolo, Dearborn Heights, MI (US); Jim J. Surman, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 503 days.

(21) Appl. No.: 15/587,496

(22) Filed: May 5, 2017

(65) Prior Publication Data
US 2018/0322712 A1 Nov. 8, 2018

(51) Int. Cl.
*G07C 5/02* (2006.01)
*B60R 13/10* (2006.01)
*H04M 1/72412* (2021.01)
*G09F 13/00* (2006.01)
*G09F 13/04* (2006.01)
(Continued)

(52) U.S. Cl.
CPC ............... *G07C 5/02* (2013.01); *B60R 13/10* (2013.01); *G09F 13/005* (2013.01); *G09F 13/0413* (2013.01); *G09F 13/22* (2013.01); *G09F 21/048* (2013.01); *H04M 1/72412* (2021.01); *B60R 13/005* (2013.01); *G01S 19/13* (2013.01); *G07B 13/02* (2013.01); *G09F 13/044* (2021.05);
(Continued)

(58) Field of Classification Search
CPC ....... G07C 5/02; B60R 13/005; G09F 13/005; G09F 13/0413; G09F 13/22; G09F 21/048; H04M 1/7253
USPC .......... 40/541, 584, 604; 362/812, 600, 612, 362/618, 634; 340/434, 7.61, 815.4, 340/815.92, 815.45, 815.48, 815.6, 340/815.65, 815.75
See application file for complete search history.

(56) References Cited

U.S. PATENT DOCUMENTS 7,200,382 B2  4/2007  Arai
7,478,492 B2  1/2009  Madonia
(Continued)

FOREIGN PATENT DOCUMENTS

BR   8901089 U2   2/2011
CN   2282510 Y    5/1998
(Continued)

*Primary Examiner* — Hai Phan
*Assistant Examiner* — Anthony D Afrifa-Kyei
(74) *Attorney, Agent, or Firm* — David Coppiellie; Carlson, Gaskey & Olds, P.C.

(57) ABSTRACT

An apparatus, according to an exemplary aspect of the present disclosure includes, among other things, a vehicle body member and at least one badge that identifies at least one service provider. The badge comprises an applique that is mounted to the vehicle body member. A control activates and deactivates illumination of the badge based on at least one of a driver or user input. A method according to an exemplary aspect of the present disclosure includes, among other things, mounting at least one badge to a vehicle body member, the badge comprising an applique that includes one or more identification logos, and illuminating at least one identification logo based on at least one of a driver or user input.

30 Claims, 6 Drawing Sheets (51) Int. Cl.
*G09F 13/22* (2006.01)
*G09F 21/04* (2006.01)
G07B 13/02 (2006.01)
H04M 1/72457 (2021.01)
B60R 13/00 (2006.01)
G01S 19/13 (2010.01)

(52) U.S. Cl.
CPC .... *G09F 13/0481* (2021.05); *G09F 2013/222* (2013.01); *H04M 1/72457* (2021.01)

(56) References Cited

U.S. PATENT DOCUMENTS

| | | | |
|---|---|---|---|
| 8,113,695 B2* | 2/2012 | Meinke | B60Q 1/2669 |
| | | | 362/351 |
| 9,613,549 B2 | 4/2017 | Salter et al. | |
| 2007/0054116 A1* | 3/2007 | Neitzke | B29C 44/1238 |
| | | | 428/343 |
| 2008/0212189 A1* | 9/2008 | Baur | B32B 7/14 |
| | | | 359/604 |
| 2009/0257241 A1* | 10/2009 | Meinke | B60Q 1/50 |
| | | | 362/546 |
| 2012/0314348 A1* | 12/2012 | Moncrieff | H05K 5/0017 |
| | | | 361/679.01 |
| 2015/0039366 A1* | 2/2015 | Haque | G06Q 10/063112 |
| | | | 705/7.14 |
| 2015/0279216 A1* | 10/2015 | Ghanma | G08G 1/202 |
| | | | 705/7.15 |
| 2017/0099714 A1 | 4/2017 | Salter et al. | |
| 2017/0200197 A1* | 7/2017 | Brubaker | G09F 21/048 |
| 2017/0293950 A1* | 10/2017 | Rathod | G06Q 30/02 |
| 2017/0293957 A1* | 10/2017 | Adler | G06F 3/04817 |

FOREIGN PATENT DOCUMENTS

| | | | |
|---|---|---|---|
| CN | 201773539 U | 3/2011 | |
| CN | 201859635 U | 6/2011 | |
| DE | 10201114959 A1 * | 4/2012 | |
| DE | 102011114959 A1 * | 4/2012 | ............ B60Q 1/268 |
| JP | 3235312 B2 | 7/1995 | |
| WO | WO 2014065780 A1 * | 5/2014 | ............ B60Q 1/326 |
| WO | WO-2014065780 A1 * | 5/2014 | ............ B60Q 1/326 |

* cited by examiner

EXTERIOR APPLIQUE CHANGEABLE STEALTH BADGING

TECHNICAL FIELD

This disclosure relates to an exemplary apparatus and method of mounting at least one badge with one or more identification logos to a vehicle body member and illuminating a desired logo based on a driver or user input.

BACKGROUND

It is import that passengers be able to easily identify ride service vehicles that are picking them up. Typically, ride service providers utilize makeshift signs to identify their vehicle as being associated with a particular ride service such as Uber or Lyft, for example. These makeshift signs are typically made from paper or cardboard and are placed in a vehicle side window, rear window, and/or windshield when the vehicle is actively providing ride services. The signs are then removed from the windows when the vehicle is out of service. These signs are not professional looking and are difficult to see at night.

SUMMARY

A method according to an exemplary aspect of the present disclosure includes the steps of, among other things: mounting at least one badge to a vehicle body member, the badge comprising an applique that includes one or more identification logos; and illuminating at least one identification logo based on at least one of a driver or user input.

In a further non-limiting embodiment of the foregoing method, the method includes communicating driver and user input via one or more of a vehicle interface, a vehicle GPS system, a driver phone application, and/or a service requester phone application.

In a further non-limiting embodiment of either of the foregoing methods, the method includes forming the badge in one or more pieces of vehicle trim.

In a further non-limiting embodiment of any of the foregoing methods, the at least one identification logo comprises one or more service provider logos, and the method includes changing color and/or blinking illumination of one or more of the logos to indicate one of a "for hire" or "not for hire" condition.

In a further non-limiting embodiment of any of the foregoing methods, the one or more service provider logos comprise ride service logos, and including increasing illumination intensity of an active ride service logo when approaching a passenger pick-up point.

In a further non-limiting embodiment of any of the foregoing methods, the method includes automatically deactivating illumination of all identification logos when the vehicle is not in service, or selectively deactivating illumination of all identification logos upon a driver deactivation request.

In a further non-limiting embodiment of any of the foregoing methods, the method includes forming the applique as part of a film, printing the at least one identification logo on the film with ink to provide a printed film, and molding the printed film within a clear plastic material to provide a molded part.

In a further non-limiting embodiment of any of the foregoing methods, the method includes positioning an illumination source on one side of the molded part and connecting the illumination source to a controller.

In a further non-limiting embodiment of any of the foregoing methods, the method includes wirelessly communicating the driver and user input via mobile phone applications to control illumination of the at least one badge.

An apparatus according to another exemplary aspect of the present disclosure includes, among other things: a vehicle body member; at least one badge that identifies at least one service provider, the badge comprising an applique that is mounted to the vehicle body member; and a control to activate and deactivate illumination of the badge based on at least one of a driver or user input.

In a further non-limiting embodiment of any of the foregoing apparatus, the at least one badge comprises a plurality of badges that each include one or more service provider logos, and wherein the control only illuminates the service provider logo associated with a current active service provider.

In a further non-limiting embodiment of either of the foregoing apparatus, the at least one service provider comprises a plurality of ride service providers each having a unique service provider logo, and wherein the user input comprises a ride request that is communicated to the control via a wireless communication device.

In a further non-limiting embodiment of any of the foregoing apparatus, the control changes color, intensity, and/or blinks illumination of the badge to indicate one of a "for hire" or "not for hire" condition.

In a further non-limiting embodiment of any of the foregoing apparatus, the vehicle body member comprises a vehicle trim piece.

In a further non-limiting embodiment of any of the foregoing apparatus, the at least one badge comprises a plurality of badges that are mounted at a plurality of different locations on the vehicle body member comprising one or more of a side passenger door, a vehicle front panel, and a vehicle rear panel.

In a further non-limiting embodiment of any of the foregoing apparatus, the user input comprises a user request of an associated service, and wherein the control illuminates the badge based on a defined distance between a service provider vehicle and the user.

In a further non-limiting embodiment of any of the foregoing apparatus, the applique comprises a film having one or more service provider logos printed on the film, and wherein the control is configured to only illuminate the service provider logo for a current active service provider.

In a further non-limiting embodiment of any of the foregoing apparatus, the film having the service provider logos is encased within a clear plastic body.

In a further non-limiting embodiment of any of the foregoing apparatus, the apparatus includes an illumination source positioned on one side of the plastic body and a clear cover positioned on an opposite side of the plastic body, and including a control circuit connecting the illumination source to the control.

In a further non-limiting embodiment of any of the foregoing apparatus, the driver or user input comprises a request for a desired service that is communicated via one or more of a vehicle interface, a vehicle GPS system, a driver phone application, and/or a service requester phone application.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary apparatus and methods of mounting at least one badge with one or more identification logos to a vehicle body member and illuminating a desired logo based on a driver or user input. These and other features are discussed in greater detail in the following paragraphs of this detailed description.

Vehicles can be utilized for various services. Often a vehicle can be utilized for different service companies and/or for different types of services that would each have their own associated unique identification logo. It is important to be able to identify the current/active service that is being provided by the vehicle. It is also important to additionally identify which service company is providing the current/active service if the vehicle operates for different companies that provide the same type of service. These types of vehicle do not currently have an effective manner for identifying service providers that can be easily seen by user that is requesting a specific service.

For example, it is important for users to be able to identify vehicles that are being utilized to provide a ride service such as Uber, Lyft, Chariot, etc. Typically, vehicles that provide these types of services use a placard or piece of paper that includes the associated company logo, and which is placed in a vehicle window. These makeshift identifiers are not professional looking and are difficult to see at night.

The subject invention provides an identifier method and apparatus that allows exterior identification/badging that can be activated/deactivated automatically and/or based on selective input from a driver and/or a user. In some situations, such as a high crime area for example, a rider or a driver may not want to call attention to their ride service vehicle. Further, certain ride services, such as a limo service for example, may only want to show badging at a passenger pick-up point. The subject identifier method and apparatus allows logo identifying information to be hidden or visible depending upon different situations. Thus, if a driver is using their vehicle to provide ride services for two different ride service companies, the subject identifier method and apparatus can be used to illuminate only the logo of the active service provider while the inactive service provider logo remains hidden. Further, when the vehicle is not providing any type of ride service, all of the logos can be hidden.

The subject identifier method and apparatus also allows communication through various types of interfaces. For example, a driver that works for two different ride service providers can have a first phone with an associated service app for Ride Service 1 and a second phone with an associated service app for Ride Service 2 that can be used while the driver accepts requests from both Ride Service 1 and Ride Service 2 throughout the day. The vehicle has badging that includes a logo badge for Ride Service 1 and a logo badge for Ride Service 2, with each logo badge being respectively linked to the app on the associated phone. When the driver accepts a fare for Ride Service 1, the phone automatically activates the Ride Service 1 logo badge while the Ride Service 2 logo badge remains hidden. Similarly, when Ride Service 2 is being used, the logo for Ride Service 1 is hidden and the logo for Ride Service 2 is illuminated.

Figure 1:
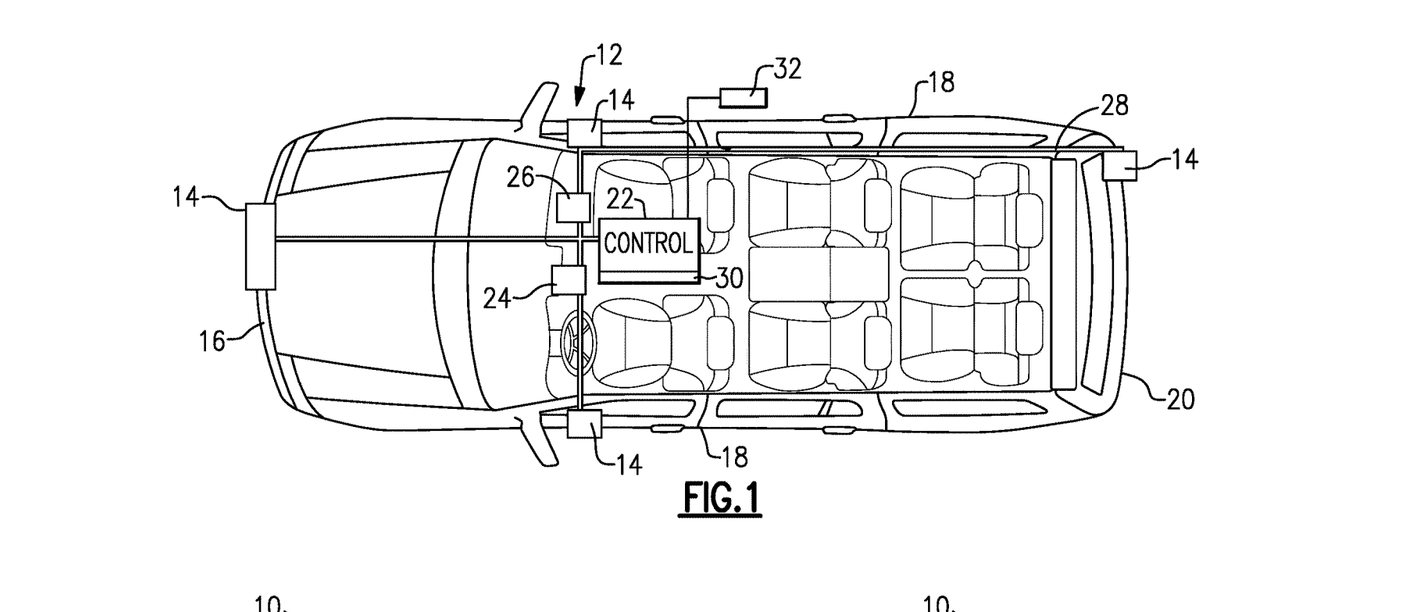
FIG. 1 schematically illustrates a vehicle including an identifier system that incorporates the subject invention.

FIG. 1 shows a vehicle 10 that utilizes an identifier system 12 that includes one or more badges 14 that include logo identifiers positioned at various external locations on the vehicle 10. For example, the badges 14 could be positioned on a vehicle front surface 16, a vehicle side surface 18, and/or a vehicle rear surface 20. The badges 14 are wired to a communication system that is part of a system control/controller 22. The identifier system 12 also utilizes a navigation system 24 and one or more sensors, such as a day/night sensor 26 for example, that are also linked to the controller 22. The badges 14 are capable of being illuminated and are all linked together via a LIN interface bus 28, for example, which is controlled by the controller 22.

The controller 22 may also communicate with an operator interface 30 and/or a user interface 32. The controller 22 can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The controller 22 may be a hardware device for executing software, particularly software stored in memory that may include one or more separate programs, each of which includes an ordered listing of executable instructions for implementing logical functions. The controller 22 can be a custom made or commercially available processor, a central processing unit (CPU), an auxiliary processor among several processors associated with the computing device, a semiconductor based microprocessor (in the form of a microchip or chip set) or generally any device for executing software instructions. The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.).

The driver and user interfaces 30, 32 can include various input and output devices that may communicate with the controller input and output interfaces. The driver interface 30, for example, may be a touch screen within the vehicle 10 via which information can be communicated to the driver/operator or through which the driver can communicate to the controller 22, or the driver interface 30 may be a wireless communication interface comprising a mobile device such as a smart phone or tablet, or an internet browser for example. In addition, the user interface 32 may also include a wireless communication interface where the user can communicate with the vehicle controller 22 and/or driver interface 30 via a mobile device such as a smart phone or tablet, or an internet browser for example.

In addition to controlling illumination of the badges 14, the identifier system 12 includes many additional features that can be accessed through a touch screen in the vehicle 10 or through the driver interface 30 via a smartphone. Some features are can be configured to automatically control illumination while other features can be configured to be selectively controller via a driver and/or user input. In one example, the badges 14 link to the vehicle GPS/navigation system 24 and change color and/or illumination intensity when approaching a pickup point. Color changes can be useful if several vehicles from the same ride service are operating in the same area. The color of the badge 14 could help the rider distinguish/identify the proper vehicle that the rider has reserved. Changing illumination intensity such that the badge 14 becomes brighter as the vehicle nears the rider for pickup would also facilitate the rider in identifying the proper vehicle. Intensity of UV/LEDs used to illuminate the badge 14 can be controlled based on input from the day/night sensor 26. Further, the illumination should be brighter as the sunlight gets brighter to prevent washout.

In another example, the badge 14 can change color and/or blink on and off with varying degrees of illumination intensity to indicate whether the vehicle 10 is "for hire" or "out of service/not for hire". For example, the badge 14 can be red if the vehicle 10 is occupied or on route to a fare. The badge 14 could be green and/or blink when the vehicle 10 is unoccupied and for hire.

In another example, the identifier system 12 includes the ability to operate the badging in a "stealth mode" where illumination is controlled to hide or deactivate illumination in certain circumstances. For example, for safety reasons, the driver may not want the badges 14 to be automatically illuminated when the ride service is active in the vehicle or has been activated via the driver's smartphone. The system 12 allows the driver to selectively deactivate illumination of all badging in such a circumstance. In one example, after illumination of the badges has been deactivated by the driver, the badges 14 are configured such that the badge re-illuminates when the Bluetooth (BLE) in a badge module or driver's smartphone recognizes the BLE in the smartphone of the oncoming rider. In one example, this recognition can occur within a range of approximately 600 feet so that the badges 14 would be illuminated in plenty of time for the rider to see the badges 14 as the vehicle 10 approaches.

Figure 2A:
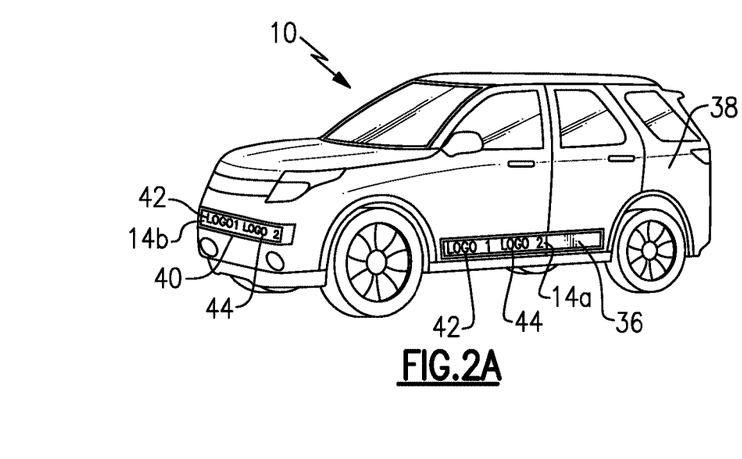
FIG. 2A is one example of a vehicle with the identifier system having a plurality of service provider logos and that is in an active illumination mode.
Figure 2B:
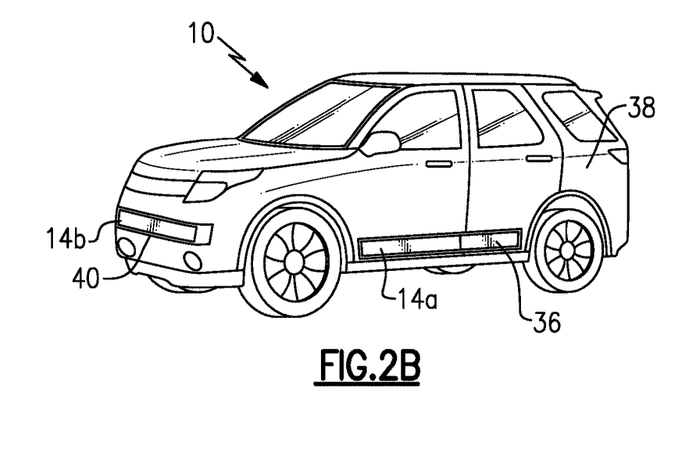
FIG. 2B is a view similar to FIG. 2B but with the identifier system being in a stealth mode to hide the service provider logos.

In one example, the badge 14 comprises an applique that is formed as part of a vehicle trim member 36 that can be located in one or more locations on a vehicle body 38. Optionally, the badge 14 can be formed as part of a body panel 40 in one or more locations on the vehicle 10. FIGS. 2A-2B show an example of a first applique badge 14a that is formed as part of a trim member 36 on a side of the vehicle body 38 and a second applique badge 14b that that is formed as part of a body panel 40 that is at the front of the vehicle body 38. In this example, the badges 14a, 14b include at least first 42 and second 44 ride service logos. In FIG. 2A, the badges 14a, 14b are illuminated, while in FIG. 2B the badges 14a, 14b are not illuminated and the vehicle 10 can be considered to be in the stealth mode. When the logos 42, 44 are not illuminated, the applique/badge 14 has the appearance of a piece of trim and/or a part of the vehicle body 38.

Figure 3A:
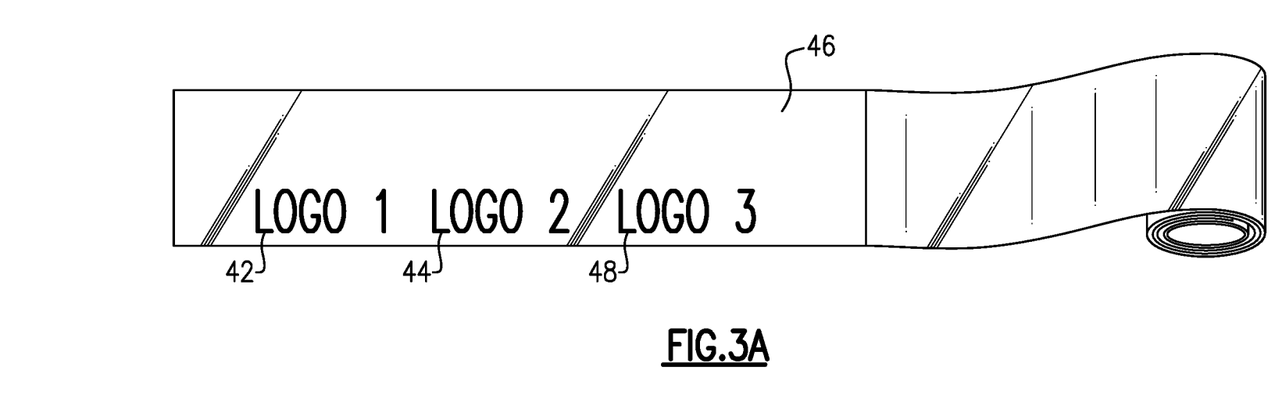
FIG. 3A is one example of a film with ink jet printed logos.
Figure 3B:
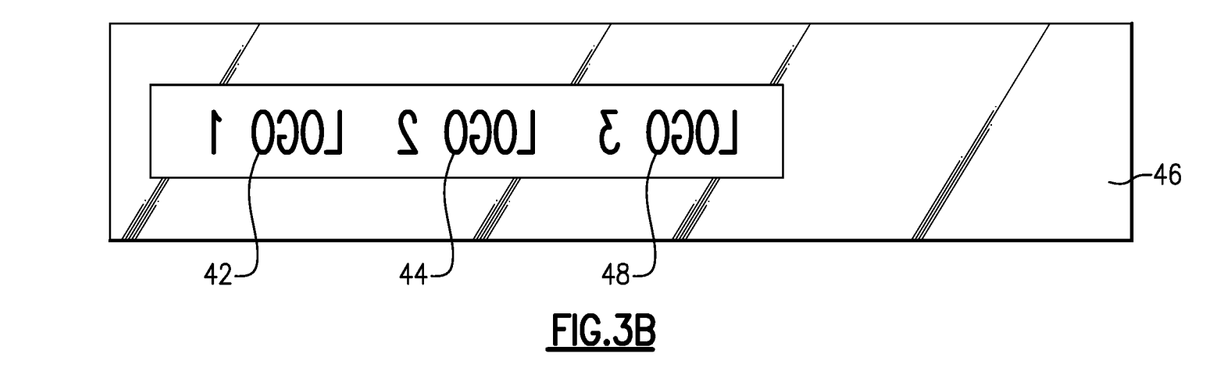
FIG. 3B is the film of FIG. 3A with a printed black background.

In one example, the badge 14 is constructed using an ink jet printing process. In one exemplary method, the construction commences by using a semi-transparent metallic or chrome film 46 as shown in FIGS. 3A-3B. There are several commercially available films that meet OEM requirements and are typically made by depositing a thin layer of film onto a back side of a polyester or other resin based film. The film 46 can then be fed into an ink jet machine (not shown) which operates in a known manner.

FIGS. 3A-3B show an example where there is a first logo 42, a second logo 44 and a third logo 48. The logos 42, 44, 48 are printed using rylene dye ink, phosphor, or other similar material in the desired color on the back of the film 46. An example of rylene dye ink is known from U.S. Pat. No. 8,232,533. The ink is semi-transparent and the logos 42, 44, 48 will glow brightly once the rylene dye ink is excited with a bank of blue LEDs from behind. The logos 42, 44, 48 will be virtually invisible during daylight or at night with the LEDs are turned off.

Once the logos 42, 44, 48 have been printed, black ink is printed around the rylene dye ink logos 42, 44, 48 as shown in FIG. 3B. When using inkjet printing, the black ink can be printed simultaneously with the printing of the logos 42, 44, 48. Once the printed film 46 is removed from the ink jet machine, the film 46 is molded to form the badge 14. The molding has a chrome or metallic appearance. This will be discussed in greater detail below.

Figure 4A:
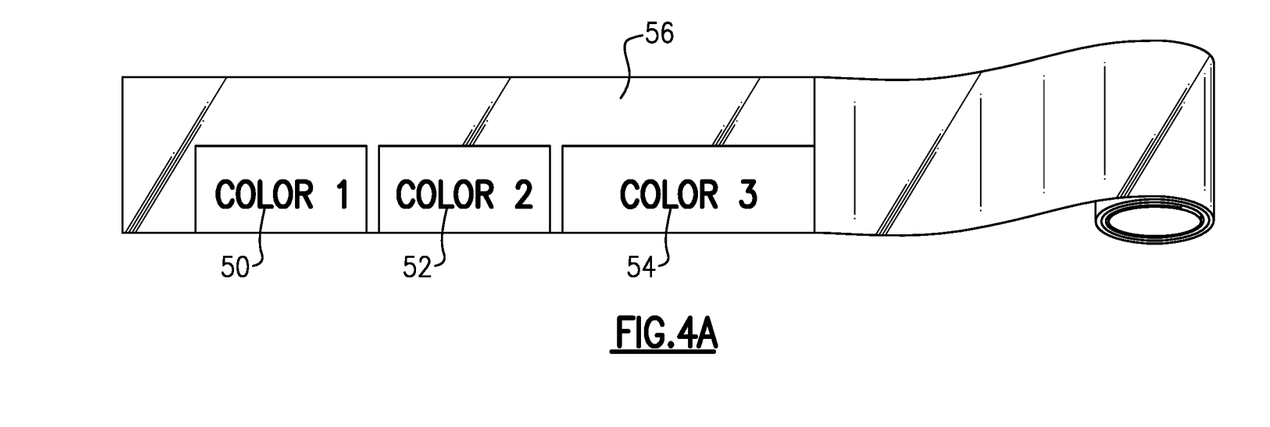
FIG. 4A is one example of a film with screen printed logos.
Figure 4B:
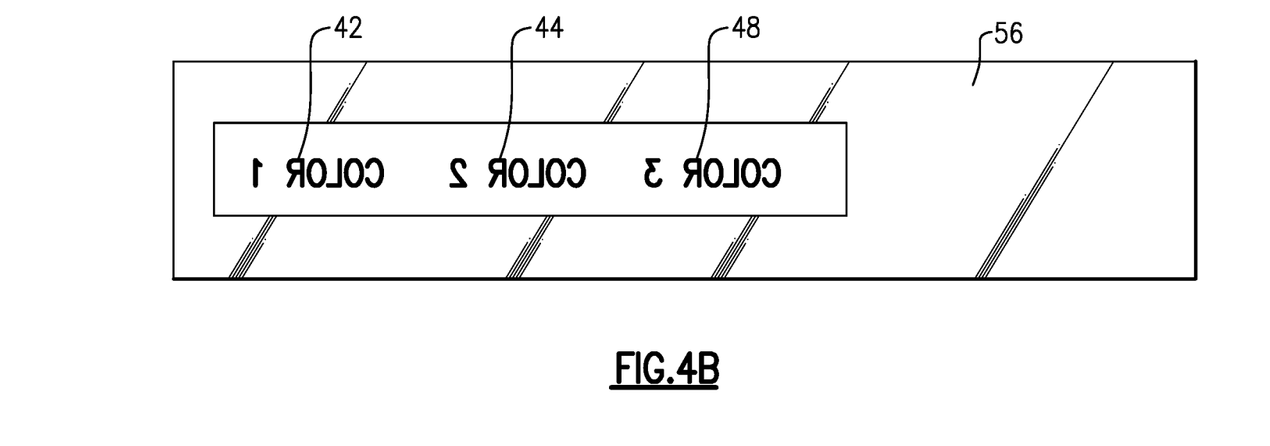
FIG. 4B is the film of FIG. 4A with a screen printed black background.

As an alternative to ink jet printing, traditional silk screen printing could be used as shown in FIGS. 4A-4B. This process allows for the use of thicker inks but is more time consuming. In this process, swatches 50, 52, 54 of rylene dye are laid down on a backside of semi-transparent metallic or chrome film 56 as shown in FIG. 4A. In this example, each swatch 50, 52, 54 is formed from a different color with each color being associated with one of three logos 42, 44, 48. In one example, the rylene dye is printed directly on the backside via vacuum metallization. Black ink surrounds the logos 42, 44, 48 as shown in FIG. 4B. In one example, the images of the logos 42, 44, 48 can be distorted slightly before the molding process to take into account distortion and stretching that can occur during molding such that when the film is molded the logos will look correct. Other methods of printing such as xerography (laser), flexography, conventional printing press, or lithography could also be used.

Figure 5A:
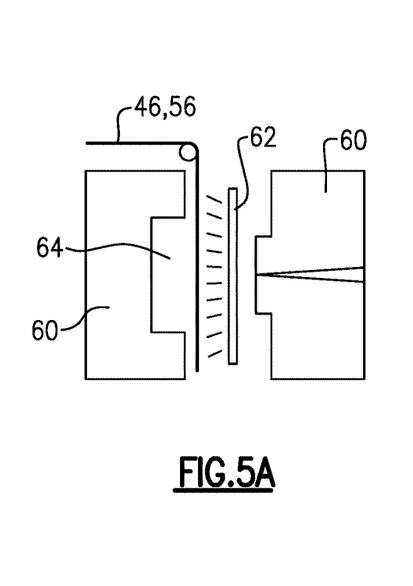
FIGS. 5A-5D show steps of one example method of molding a badge including the film from FIG. 3B or 4B.
Figure 5B:
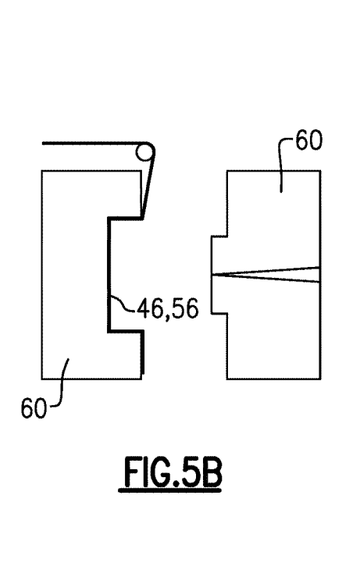
Figure 5C:
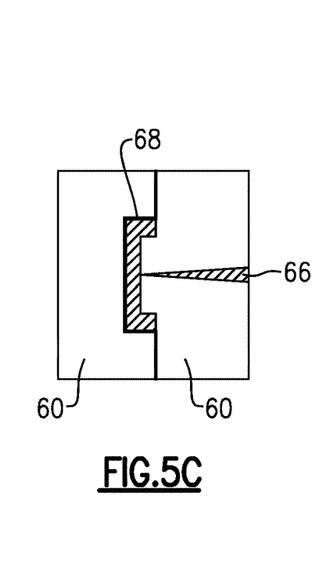
Figure 5D:
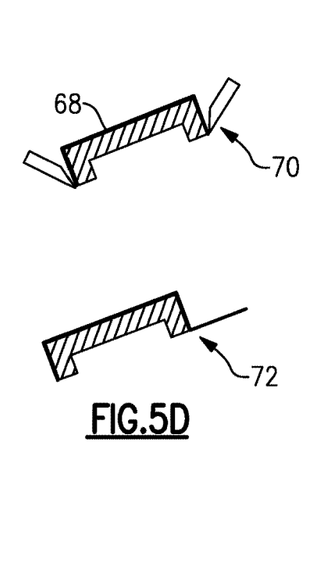

As discussed above, once the logos 42, 44, 48 are formed via a printing process, the film 46, 56 is molded using any of various known molding methods. In one example, a continuous film molding process is used as shown in FIGS. 5A-D. As shown in FIG. 5A, the film 46, 56 is fed into a mold 60 and is heated using a heater 62. As shown in FIG. 5B, the film 46, 56 is vacuumed into a cavity 64 of the mold 60 while the mold 60 closes. Next, as shown in FIG. 5C, a clear plastic 66 such as acrylic or polycarbonate, for example, is injection molded behind the film 46, 56 when the mold 60 is closed to provide a molded part 68. The part 68 is then removed from the mold 60 and trimmed as indicated at 70 in FIG. 5D. The trimmed part 68 is then transferred at 72 to be assembled to form the badge 14. This will be discussed in greater detail below.

Figure 6A:
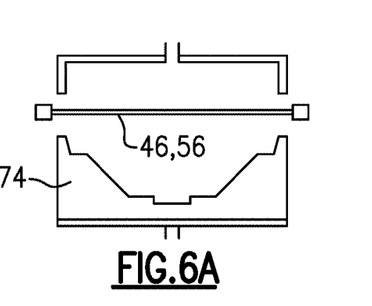
FIGS. 6A-6H show steps of another example method of molding a badge including the film from FIG. 3B or 4B.
Figure 6B:
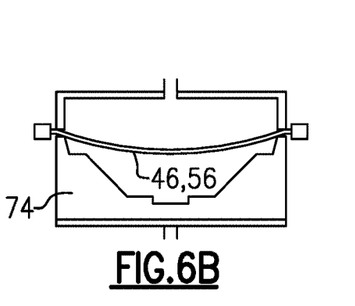
Figure 6C:
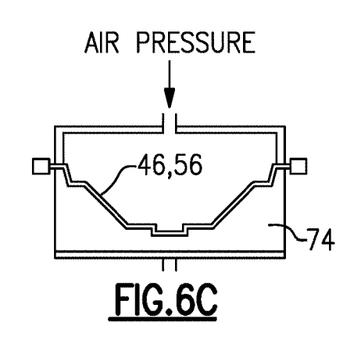
Figure 6D:
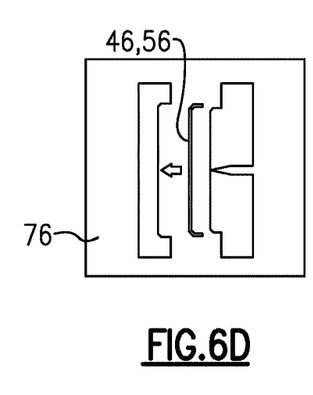
Figure 6E:
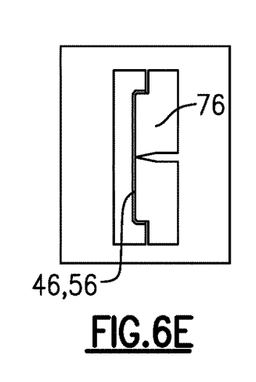
Figure 6F:
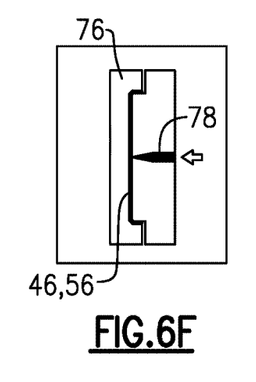
Figure 6G:
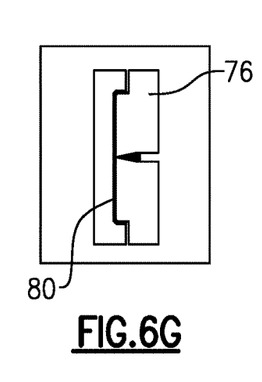
Figure 6H:
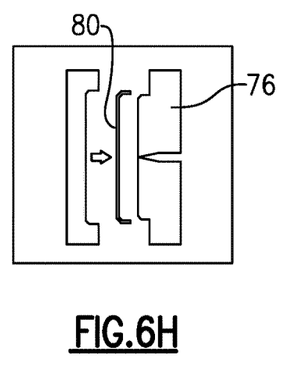

In an alternate example, a vacuum form and insert molding process is used as shown in FIGS. 6A-6H. In this example, the film 46, 56 is inserted into a pressure forming tool 74 as shown in FIG. 6A. The film 46, 56 is heated as shown in FIG. 6B, and then air pressure and vacuuming is performed as shown in FIG. 6C. The film 46, 56 is then removed and trimmed and placed into a cavity of an injection molding tool 76 as shown in FIG. 6D. The tool 76 is closed as shown in FIG. 6E and then a clear plastic 78 such as acrylic or polycarbonate, for example, is injection molded behind the film 46, 56 as shown in FIG. 6F to form a molded part 80. The part 80 is then cooled as shown in FIG. 6G and is subsequently removed from the tool 76 as shown in FIG. 6H.

Figure 7:
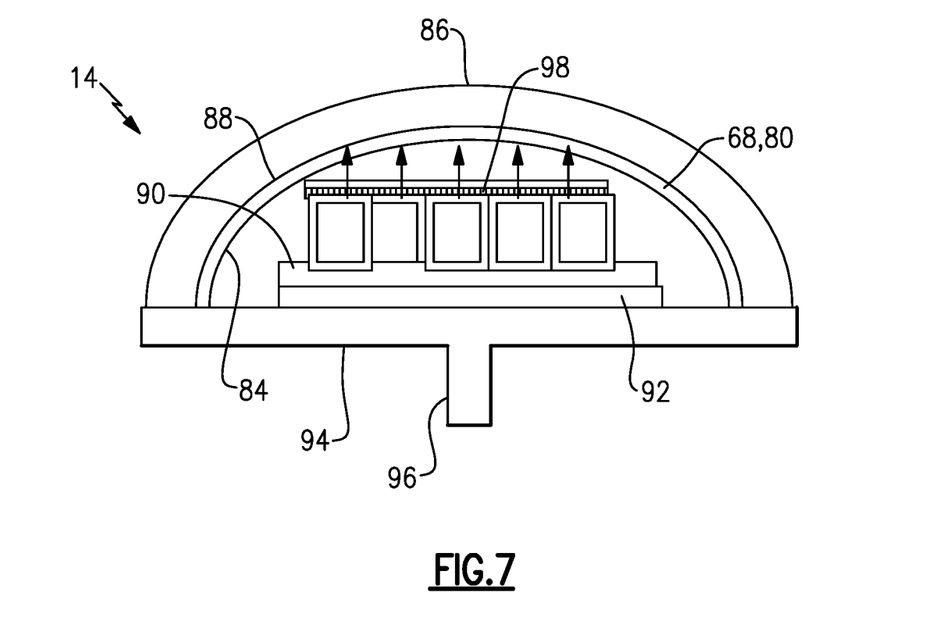
FIG. 7 is a schematic view of a badge incorporating a molded part including the printed film with the plurality of logos.

FIG. 7 shows an example of a final badge assembly 14. The molded part 68, 80 has a bank of LEDs 82 positioned on a rear side 84 of the part 68, 80 and a clear plastic lens or cover 86 positioned over a front side 88 of the part 68, 80. A circuit board 90 is positioned behind the LEDs 82 and connects the LEDs 82 to the controller 22. A thermally conductive layer of adhesive 92 is used to attach the LEDs 82 and circuit board 90 to a backing 94 that includes an attachment interface 96 to be connected to the vehicle 10.

The LEDs 82 are configured to have enough power to brightly light the rylene dye logos 42, 44, 48 during the day. A molded or extruded diffuser 98 is attached to an outer surface of each bank of LEDs 82. The diffuser 98 can be constructed from a diffusion grade polycarbonate or acrylic material such as Cyro/Evonic's ACRYLITE® Satineice WD854, for example. Optional diffusion optics can be added to the top surface to enhance the diffusion properties of the diffuser 98 as needed.

The lens or cover 86 can be molded from a clear plastic such as acrylic or polycarbonate for example. The lens or cover 86 can be attached to the backing 94 using adhesive, sonic welding, or laser welding for example. The layer of adhesive 92 that attaches the LEDs 82 and circuit board 90 to the backing 94 also helps remove heat from the badge 14. The backing 94 can be injection molded and could be made from a thermally conductive polymer if heat sinking is required. For example, a material such as that offered by the CoolPoly® series by Celanese could be used.

Further, the appliques/badges 14 are designed to be easily removable via the attachment interface 96 such that service can be done or such that logos can be removed, added, changed, etc. Also, if a driver becomes a ride service provider after they have already purchased a vehicle 10, trim from the vehicle can be replaced with a badge 14 using the same attachment points. The BLE in the badge 14 can then be initialized to the driver's phone.

The subject invention provides badges 14 that are specifically designed to support stealth badging for ride services, limo services, autonomous vehicles, etc. BLE in the molded badge 14 is linked to the driver's phone, ride or navigation app, and/or the vehicle GPS/navigation system 24 to turn badges 14 on, to change color and/or intensity when nearing a pickup point, and/or to turn off in certain circumstances. The badging system 12 can be engaged by either the driver or the rider. The system 12 can also be configured such that badges 14 only turn on at locations where the rider can see the badge during pickup based on BLE triangulation of the rider's phone. This further enhances safety as people on the opposite side of the vehicle from the rider would not see a lit badge that would identify the vehicle as a ride service provider.

The system 12 could also be configured to deactivate illumination based on a geo-fenced area. For example, the badges would be off in an unsafe area and would be on in a safe area as defined by company policies or driver preferences. The system 12 further includes the ability to change color and/or blink lighting to indicate whether the vehicle 10 is for hire or not. Further, blinking or changing color could be used to identify where open seating is available within the vehicle 10.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method, comprising:
   providing a vehicle body member that comprises a body panel or trim for the body panel;
   molding at least one badge to form part of the vehicle body member, the badge comprising an applique that includes one or more identification logos;
   forming the applique as part of a film;
   molding the film within a clear plastic material to provide a molded part; and
   illuminating at least one identification logo based on at least one of a driver or user input.

2. The method according to claim 1, including communicating driver and user input via one or more of a vehicle interface, a vehicle GPS system, a driver phone application, and/or a service requester phone application.

3. The method according to claim 1, including forming the badge in one or more pieces of vehicle trim.

4. The method according to claim 1, wherein the at least one identification logo comprises one or more service provider logos, and including changing color and/or blinking illumination of one or more of the logos to indicate one of a "for hire" or "not for hire" condition.

5. The method according to claim 4, wherein the one or more service provider logos comprise ride service logos, and including increasing illumination intensity of an active ride service logo when approaching a passenger pick-up point.

6. The method according to claim 1, including automatically deactivating illumination of all identification logos when the vehicle is not in service, or selectively deactivating illumination of all identification logos upon a driver deactivation request.

7. The method according to claim 1, including printing the at least one identification logo on the film with ink to provide a printed film, and molding the printed film within the clear plastic material to provide the molded part.

8. The method according to claim 7, including positioning an illumination source on one side of the molded part and a clear cover on an opposite side of the molded part, connecting a circuit board to the illumination source, and attaching the illumination source and circuit board to a backing that includes an attachment interface to be selectively connected to a vehicle.

9. The method according to claim 1, providing the at least one badge with a wireless communication capability, and including wirelessly communicating the driver and user input via mobile phone applications to the at least one badge to control illumination of the at least one badge.

10. An apparatus, comprising:
a vehicle body member that comprises a body panel or trim for the body panel;
at least one badge that identifies at least one service provider, the badge comprising an applique that is mounted to the vehicle body member, and wherein the badge is molded to form part of the body panel and/or trim;
at least one first wireless communication device associated with the badge or a driver;
at least one second wireless communication device associated with a user; and
a control to control illumination of the badge based on communication between the first and second wireless communication devices, and wherein the at least one badge comprises a plurality of badges that each include one or more service provider logos, and wherein the control only illuminates the service provider logo associated with a current active service provider.

11. The apparatus according to claim 10, wherein the at least one service provider comprises a plurality of ride service providers each having a unique service provider logo, and wherein the at least one badge includes the first wireless communication device, and wherein the user input comprises a ride request that is generated via the second wireless communication device and that is communicated to the first wireless communication device.

12. The apparatus according to claim 11, wherein the control changes color, intensity, and/or blinks illumination of the badge to indicate one of a "for hire" or "not for hire" condition.

13. The apparatus according to claim 10, wherein the vehicle body member comprises a vehicle trim piece.

14. The apparatus according to claim 10, wherein the plurality of badges are mounted at a plurality of different locations on the vehicle body member which comprises one or more of a side passenger door, a vehicle front panel, and a vehicle rear panel.

15. The apparatus according to claim 10, wherein the user input comprises a user request of an associated service, and wherein the control illuminates the badge based on a defined distance between a service provider vehicle and the user.

16. The apparatus according to claim 10, wherein the applique comprises a film having one or more service provider logos printed on the film, and wherein the control is configured to only illuminate the service provider logo for a current active service provider.

17. An apparatus, comprising:
a vehicle body member that comprises a body panel or trim for the body panel;
at least one badge that identifies at least one service provider, the badge comprising an applique that is mounted to the vehicle body member, and wherein the badge is molded to form part of the body panel and/or trim, and wherein the applique is formed as part of a film having a service provider logo molded within a clear plastic body to form a molded part;
at least one first wireless communication device associated with the badge or a driver;
at least one second wireless communication device associated with a user; and
a control to control illumination of the badge based on communication between the first and second wireless communication devices.

18. The apparatus according to claim 17, including an illumination source positioned on one side of the clear plastic body and a clear cover positioned on an opposite side of the clear plastic body, and including a circuit board connected to the illumination source, and wherein the circuit board is attached to a backing that includes an attachment interface to be selectively connected to a vehicle.

19. The apparatus according to claim 10, wherein the driver or user input comprises a request for a desired service that is communicated via one or more of a vehicle interface, a vehicle GPS system, a driver phone application, and/or a service requester phone application.

20. The apparatus according to claim 10, wherein the control is configured to automatically deactivate illumination of the badge based on a specified geo-fenced area.

21. The apparatus according to claim 10, wherein the badge includes an attachment interface that is selectively attachable and removable from the body panel and/or trim to change or repair the at least one badge.

22. The apparatus according to claim 10, wherein, subsequent to deactivation of illumination of the badge, the badge is configured to re-illuminate when a control signal from the control or a driver device recognizes a recipient signal in a device of a destination source.

23. The method according to claim 1, including automatically deactivating illumination of the badge based on a specified geo-fenced area.

24. The method according to claim 1, including providing the badge with an attachment interface that is selectively attachable and removable from the body panel and/or trim to change or repair the at least one badge.

25. The method according to claim 1, wherein, subsequent to deactivation of illumination of the badge, the method includes re-illuminating the badge when a control signal from a vehicle control or a driver device recognizes a recipient signal in a device of a destination source.

26. The apparatus according to claim 10, wherein the at least one badge includes at least one ride service provider logo, and wherein the user input comprises a ride request that is generated via the second wireless communication device and that is communicated to the first wireless communication device, and wherein the badge is illuminated when one of the first or second wireless communication device recognizes the other of the first and second wireless communication devices.

27. The apparatus according to claim 26, wherein recognition occurs within a predetermined distance between the driver and a rider.

28. The method according to claim 1, wherein the one or more identification logos includes at least one ride service provider logo, and including
providing the at least one badge and/or a driver with a first wireless communication device,
generating a ride request via a second wireless communication device as the user input,
communicating the ride request to the first wireless communication device, and
illuminating the badge when one of the first and second wireless communication devices recognizes the other of the first and second wireless communication devices.

29. The method according to claim 28, wherein recognition occurs within a predetermined distance between the driver and a rider.

30. The method according to claim 1, including heating the film prior to molding the film within a clear plastic material.

* * * * *